United States Patent Office 2,883,399
Patented Apr. 21, 1959

2,883,399

METHOD OF PREPARING L(+)-GLUTAMINE

Gaston Amiard, Noisy-le-Sec, René Heymes, Romainville, and Leon Velluz, Paris, France, assignors to UCLAF, Paris, France, a body corporate of France No Drawing. Application June 27, 1956
Serial No. 594,117

Claims priority, application France July 7, 1955

7 Claims. (Cl. 260—389)

This invention relates to a new method of preparing L(+)-glutamine or the γ-amide of L-glutamic acid $$HOOC-CH-CH_2-CH_2-CONH_2$$
$$|$$
$$NH_2 \quad (VI)$$

The synthesis of this compound has been difficult until now because L-glutamic acids and the derivatives thereof racemize very readily.

In a prior publication (G. Amiard, R. Heymes and L. Velluz, Bull. Soc. Chim. No. 2, 191, 1955), we have described a method of producing N-trityl-amino acids by reacting trityl chloride with an amino acid ester and saponifying the N-trityl amino ester into N-trityl amino acid by treating with hot alkalies, particularly potassium hydroxide-methanol and potassium hydroxide-propylene glycol solutions.

Now we made the unexpected discovery that, due to the particular properties of dibenzyl N-trityl L(+)-glutamate (II), which is readily obtainable according to this aforedescribed method by causing trityl chloride to act upon dibenzyl glutamate (I), the former can be efficiently converted into L(+)-glutamine.

L(+)-glutamine has become increasingly important in the recent past as one of the constituents of the nutrient media used in making Salk vaccine and it is the principal object of the present invention to provide a largescale method of producing L(+)-glutamine that is commercially feasible. It is another object of this invention to produce L(+)-glutamine without any racemization during the operation and to realize hitherto unattainable yields at the various stages of the production.

Referring more specifically to the herein-claimed discovery, we found that, by means of methanolysis in the presence of sodium methylate, compound II can be converted to α-benzyl, γ-methyl N-trityl L(+)-glutamate (III). Upon subjecting this mixed diester to a careful hydrogenolysis in the presence of an alkaline agent in order to avoid detritylation of the product by the liberated acid rest, γ-methyl N-trityl L(+)-glutamate (IV) is obtained. As the next step, ammonia is caused to react with compound IV in order to produce N-trityl L-glutamine (V), which is readily detritylated, at excellent yields, into L(+)-glutamine by heating with aqueous acetic acid. At the same time, a large part of the trityl chloride used at the beginning of the synthesis is recovered in form of triphenylcarbinol.

The following examples are submitted to illustrate the invention without intent, however, of limiting the invention thereto.

The melting points mentioned in the examples are instantaneous melting points obtained by means of the heated block method.

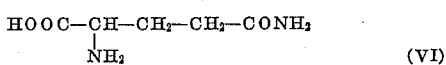

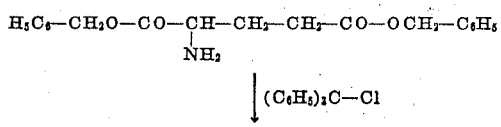

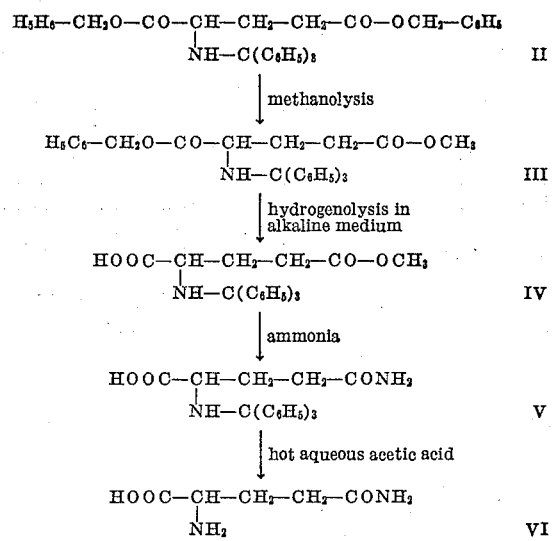

EXAMPLE 1

Preparation of dibenzyl N-trityl L(+)-glutamate (II)

18.2 g. of dibenzyl L(+)-glutamate (I) in form of the hydrochloride prepared according to the method of H. Sachs and E. Brand (J. Am. Chem. Soc., 1953, 75, 4610) are dissolved in 100 cc. of chloroform. The solution is cooled to 0° C., and 15 cc. of triethylamine are added. While keeping the temperature at 0° C., 14 g. of trityl chloride are added and the solution is left standing at room temperature for 48 hours. After washing the chloroform solution, in which the triethylamine hydrochloride formed has crystallized in part, first with water, then with hydrochloric acid, and then again with water until the reaction of the wash is neutral, the solution is dried over magnesium sulfate and evaporated to dryness in a water bath at 40° C. Having taken up the residue with 75 cc. of hot, absolute alcohol, of which about 15 cc. are distilled off in order to completely eliminate the chloroform, crystallization is initiated by scraping the walls of the flask with a stirrer. The mixture is chilled, desiccated, and washed with methanol. 23.1 g., equivalent to a yield of 81%, of a product are obtained that can be used directly for conversion into the mixed diester (III).

The mother liquor is vacuum evaporated to dryness and the residue taken up with 30 cc. of ether. Gaseous hydrochloric acid is passed through, and the hydrochloride of dibenzyl glutamate which precipitates is separated, dried and washed with ether. This procedure results in 2 g., or in a yield of 11%, of product I which can be directly reused. The total yield thus amounts to 92%. For purposes of analysis, the dibenzyl N-trityl L(+)-glutamate is recrystallized in alcohol. Melting point=87–89°, $[\alpha]_D^{20} = +35.5°$ ($c=2\%$, chloroform). This new compound is obtained in form of prisms, soluble in acetone, benzene, chloroform and ether, difficultly soluble in alcohol, insoluble in diluted aqueous alkalies and water.

Analysis.—$C_{38}H_{35}O_4N = 569.67$. Calculated: 80.11% C; 6.19% H; 2.46% N. Found: 80.0% C; 6.3% H; 2.5% N.

EXAMPLE 2

Preparation of α-benzyl, γ-methyl N-trityl L-glutamate (III)

A mixture consisting of 11.4 g. of dibenzyl N-trityl glutamate, obtained according to Example 1, and of 50 cc. methanol containing 0.5 cc. of a solution of 2.3 g. of sodium in 100 cc. methanol is boiled while refluxing. The solid ester changes first into an oil, which dissolved rather rapidly. After the solution has become entirely clear, refluxing is continued for two minutes, whereupon the solution is left to cool by itself while it is stirred from time to time. Crystallization takes place in form of long prisms. The mixture is chilled for 15 minutes, and the crystals are separated, dried, washed with iced methanol, and again dried, resulting in 9 g. (or a yield of 91%) of the mixed diester III which is sufficiently pure to be used directly for the following production stage. Melting point=91–92° C., $[\alpha]_D^{20}=+36.2°$ ($c=2\%$, chloroform). These constants do not change after recrystallization. This new product is obtained in form of prisms, soluble in acetone, benzene, chloroform, difficultly soluble in ethanol, insoluble in water and aqueous diluted alkalies.

*Analysis.*—$C_{32}H_{31}O_4N=493.6$. Calculated: 77.86% C; 6.33% H; 12.97% O; 2.84% N. Found: 78.0% C; 6.3% H; 13.1% O; 2.9% N.

EXAMPLE 3

*Preparation of γ-monomethyl N-trityl L-glutamate (IV)*

Palladium black which serves as catalyst for the hydrogenolysis is prepared by hydrogenation of a mixture of 5 cc. of a 2% palladium chloride solution in 30 cc. of water and 2 g. of charcoal. The palladium black is separated, first washed with water, then with alcohol, but is not completely dried thereafter.

The catalyst thus prepared is introduced into a solution of 10 g. of the mixed diester (III) in 100 cc. of cyclohexane containing 3 cc. of triethylamine, and hydrogen is passed through the mixture. After twenty minutes of this operation, fixation of 440 cc. of hydrogen has taken place instead of 450 cc. as theoretically required. The catalyst is separated from the liquid and washed with a small amount of alcohol, while the filtrate is first concentrated to a small volume under partial vacuum and then taken up with 50 cc. of ether. The ether solution is washed with normal hydrochloric acid in order to convert the triethylamine salt of compound IV into the free acid. The acidic aqueous solution is extracted several times with ether, and the combined extracts are first washed with water and then dried over magnesium sulfate. The residue obtained after evaporation of the ether is taken up with 20 cc. of hot cyclohexane. After crystallization has taken place, the mixture is chilled and the crystals are separated, washed with a small amount of cold cyclohexane and dried. 7.5 g., or a yield of 92%, of the methyl monoester (IV) are obtained in form of white needles, having a melting point of 116–117° C., $[\alpha]_D^{20}=+48°\pm1$ ($c=2\%$, methanol). These constants are not changed upon recrystallization. This new product is soluble in alcohol, benzene, ether, less soluble in cold cyclohexane, insoluble in water.

*Analysis.*—$C_{25}H_{25}O_4N=403.46$. Calculated: 74.42% C; 6.25% H; 15.86% O; 3.47% N. Found: 74.4% C; 6.3% H; 16.0% O; 3.6% N.

EXAMPLE 4

*Preparation of N-trityl L(+)-glutamine (V)*

8.06 g. of γ-monomethyl N-trityl L(+)-glutamate (IV), prepared according to Example 3, are dissolved in 30 cc. of a commercial, 22° Bé. ammonia solution and 15 cc. of methanol. The vessel containing the mixture is placed in a brine bath having a temperature of −10° C. and is saturated with ammonia by introducing for 15 minutes a stream of gaseous ammonia. Immediately thereafter, the vessel is hermetically sealed and left standing at room temperature for 40 to 45 hours. Having concentrated the solution to a small volume under vacuum in a water bath at 40° C., 40 cc. of water are added to the sirup obtained in this manner. After cooling until incipient turbidity caused by precipitation of the ammonium salt of the N-trityl-glutamine, the mixture is acidified with acetic acid while stirring. Compound V precipitates in powdery form. It is kept in the cold for 30 minutes, separated, washed twice with ice-water and desiccated over sulfuric acid. The procedure results in 7.7 g., or a yield of 92%, of crude N-trityl L-glutamine.

EXAMPLE 5

*Preparation of L(+)-glutamine (VI) by detritylation of N-trityl L(+)-glutamine (V)*

20 cc. of 50% aqueous acetic acid are added to 7.7 g. of compound V obtained according to Example 4. The mixture is placed on a boiling water bath for five minutes while stirring. Simultaneously with the crystallization of triphenylcarbinol, the glutamine dissolves. After adding 10 cc. of water, the solution is chilled and the triphenylcarbinol separated and washed with water. Upon drying, 4.7 g. of triphenyl carbinol are recovered. The filtrate is vacuum concentrated to a small volume in a water bath at 40° C. Part of the L(+)-glutamine crystallizes. 30 cc. of absolute alcohol are added and the solution is agitated and chilled. After separating the crystalline precipitate, washing with alcohol, and drying, 2.45 g. of the crude product are obtained which are dissolved in 10 cc. of hot water. 10 cc. of hot, absolute alcohol are added, and the mixture is allowed to cool and crystallize. After half an hour, another 10 cc. of alcohol are added, and the mixture is left standing in the cold. Upon separation, washing with alcohol and drying, 2.2 g., or a yield of 75%, of L(+)-glutamine are obtained. Melting point=183–185° C. (in a capillary tube), $[\alpha]_D^{20}=+7°\pm0.5°$ ($c=4\%$, water). The product is completely identical with L(+)-glutamine as described in the literature.

It will be obvious that many changes may be made in carrying out this method without exceeding the scope of the appended claims. Thus, instead of commencing the synthesis by starting with the free dibenzyl glutamate, this compound can be used in form of an acid salt, from which it is liberated by the action of the base, added in sufficient excess to bind the free acid. In lieu of carrying out the tritylation in the presence of triethylamine and chloroform as the solvent, other organic bases and other solvents may be used. Similarly, in the alcoholysis leading to compound III, other alkaline transesterification agents than sodium methylate may be employed. Instead of resorting to a methanolysis, other lower alcohols, such as ethanol or propylene glycol solutions of an alkali metal may be used, but the yields obtained during the subsequent amide formation are then somewhat lower.

We claim:

1. In the process of producing L(+)-glutamine, the steps which comprise adding triphenyl methyl chloride at a temperature of about 0° C. to a solution of dibenzyl L(+)-glutamate in chloroform containing triethylamine, allowing the mixture to stand at room temperature to cause N-tritylation, boiling, under reflux, the resulting separated N-trityl dibenzyl glutamate in the solution of an alkali metal alcoholate in a lower alkanol to cause dissolution of said N-trityl dibenzyl glutamate and transesterification, hydrogenating the resulting separated N-trityl-α-benzyl-γ-lower alkyl glutamate in cyclohexane in the presence of triethylamine and a palladium catalyst precipitated on charcoal to split off the α-benzyl group, dissolving the resulting separated N-trityl-γ-lower alkyl glutamate in an aqueous methanolic ammonia solution, saturating the mixture with ammonia gas at a temperature of about −10° C., allowing the hermetically sealed reaction mixture to stand at room temperature until ammonolysis of the γ-lower alkyl ester group is completed, heating the resulting separated N-trityl-L(+)-glutamine with about 50% aqueous acetic acid to cause detritylation, adding water to the reaction mixture, cooling the mixture, separating the precipitated triphenyl carbinol, and separating L(+)-glutamine from the solution.

2. In the process of producing L(+)-glutamine, the steps which comprise adding triphenyl methyl chloride at a temperature of about 0° C. to a solution of dibenzyl L(+)-glutamate in chloroform containing triethylamine, allowing the mixture to stand at room temperature to cause N-tritylation, boiling under reflux the resulting N-trityl dibenzyl glutamate in the solution of sodium methylate in methanol to cause dissolution of said N-trityl dibenzyl glutamate and transesterification, hydrogenating the resulting separated N-trityl-α-benzyl-γ-methyl glutamate in cycloahexane in the presence of triethylamine and a palladium catalyst precipitated on charcoal to split off the α-benzyl group, dissolving the resulting separated N-trityl-γ-methyl glutamate in an aqueous methanolic ammonia solution, saturating the mixture with ammonia gas at a temperature of about −10° C., allowing the hermetically sealed reaction mixture to stand at room temperature until ammonolysis of the γ-methyl ester group is completed, heating the resulting separated N-trityl-L(+)-glutamine with about 50% aqueous acetic acid to cause detritylation, adding water to the reaction mixture, cooling the mixture, separating the precipitated triphenyl carbinol, and separating L(+)-glutamine from the solution.

3. The N-trityl-L(+)-glutamic acid compound of the formula

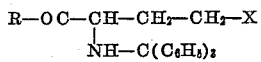

wherein:

R is a member selected from the group consisting of the hydroxyl group and the benzyloxy group, and X represents a member selected from the group consisting of a carbo lower alkoxy group and the carbo benzyloxy group.

4. The dibenzyl ester of N-trityl-L(+)-glutamic acid of the formula

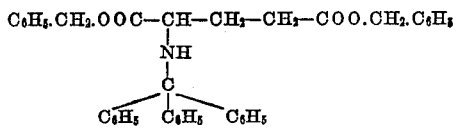

5. The α-benzyl-γ-methyl ester of N-trityl-L(+)-glutamic acid of the formula

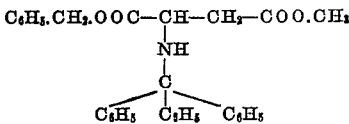

6. The γ-methyl ester of N-trityl-L(+)-glutamic acid of the formula

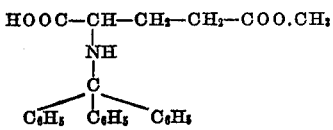

7. N-trityl L(+)-glutamine.

References Cited in the file of this patent
Amiard et al.: Bull. Soc. Chim. No. 2, 191 (1955).